United States Patent [19]
Gabbitas et al.

[11] 4,441,302
[45] Apr. 10, 1984

[54] CIGARETTE PACKAGING MACHINE CONTROL AND MONITORING SYSTEM

[75] Inventors: Denbigh M. Gabbitas, Orpington; Peter J. Shawyer, London, both of England

[73] Assignee: Molins Limited, London, England

[21] Appl. No.: 174,505

[22] Filed: Aug. 1, 1980

[30] Foreign Application Priority Data

Aug. 2, 1979 [GB] United Kingdom ............... 7927003

[51] Int. Cl.³ .......................... B65B 19/28; H04Q 5/00
[52] U.S. Cl. .......................................... 53/52; 53/77; 53/508; 340/825.05; 364/138
[58] Field of Search .................. 53/52, 77, 507, 508; 364/138, 139, 137, 132; 340/825.05, 825.16, 825.17

[56] References Cited

U.S. PATENT DOCUMENTS

| | | | |
|---|---|---|---|
| 3,513,302 | 5/1970 | Jacques et al. | 364/137 |
| 3,911,643 | 10/1975 | Davies | 53/236 |
| 4,124,887 | 11/1978 | Johnson et al. | 364/138 |

FOREIGN PATENT DOCUMENTS

| | | |
|---|---|---|
| 926688 | 5/1963 | United Kingdom . |
| 1027726 | 4/1966 | United Kingdom . |
| 1039800 | 8/1966 | United Kingdom . |
| 1123990 | 8/1968 | United Kingdom . |
| 1195459 | 6/1970 | United Kingdom . |
| 1265276 | 3/1972 | United Kingdom . |
| 1294326 | 10/1972 | United Kingdom . |
| 1384636 | 2/1975 | United Kingdom . |
| 1415183 | 11/1975 | United Kingdom . |
| 1437959 | 6/1976 | United Kingdom . |
| 1468966 | 3/1977 | United Kingdom . |

*Primary Examiner*—James F. Coan
*Attorney, Agent, or Firm*—Antonelli, Terry & Wands

[57] ABSTRACT

A control and monitoring system for cigarette packaging machines comprises a control station (1) connected in cascade to each of a plurality of remote stations (2 and 3) in turn, in a ring. The control station 1 supplies an interrogation signal to a D-type latch (20, 30) of the first remote station, which changes state on the next clock pulse edge and applies an interrogation signal to the D-type latch of the second remote station so that the stations are sequentially interrogated in essentially non-overlapping time periods. An interrogated station communicates with the control center (1) via an information line (16) either to receive machine control signals to be passed on to a machine or machine part with which the remote station is associated, or to send machine fault signals indicating a fault in the associated machine or machine part.

31 Claims, 5 Drawing Figures

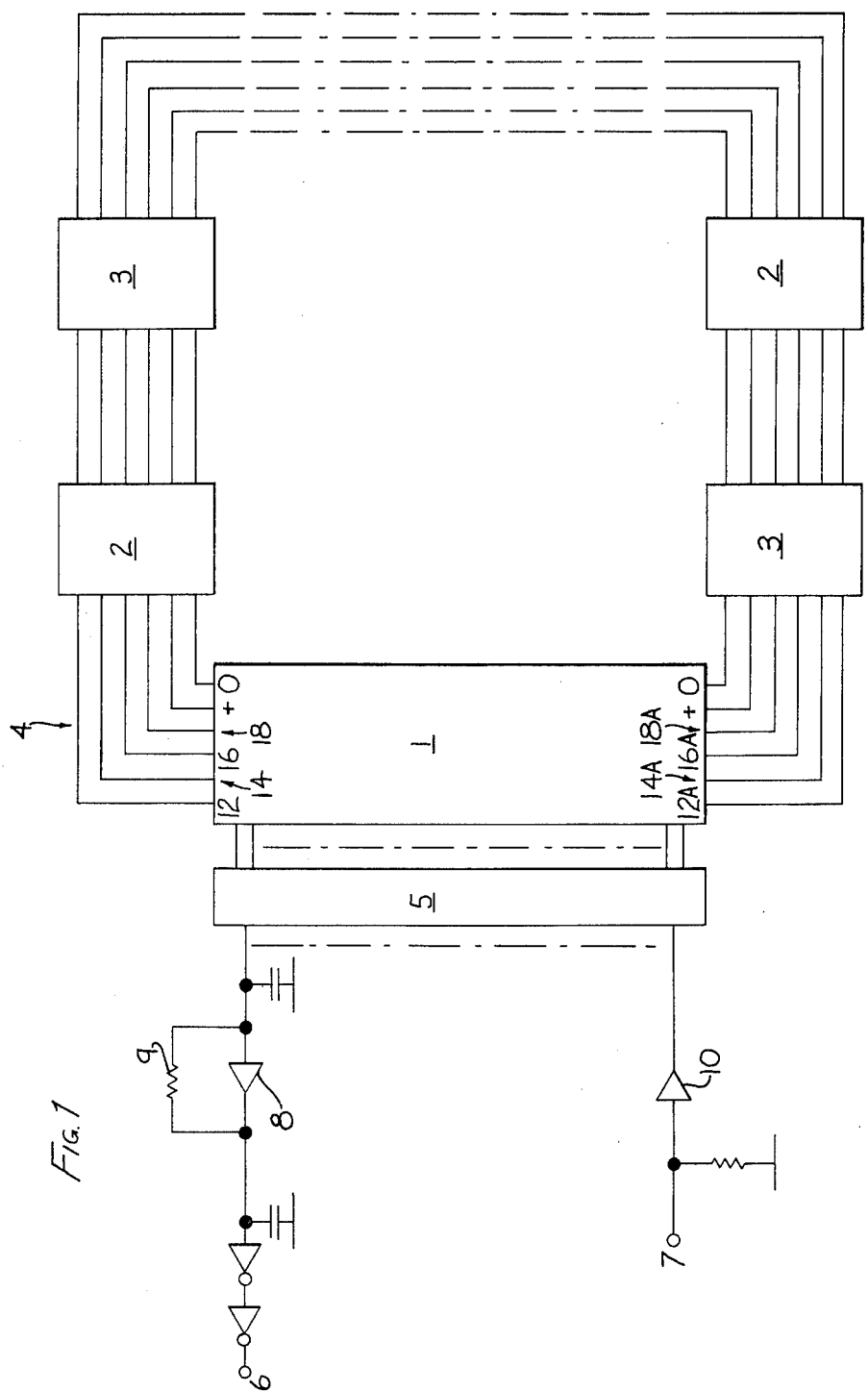

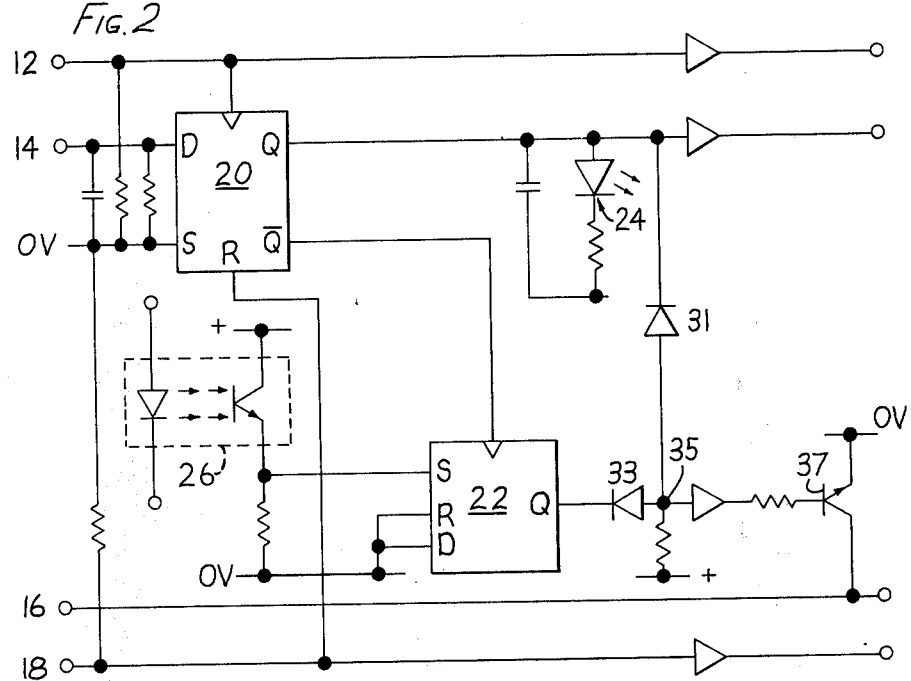
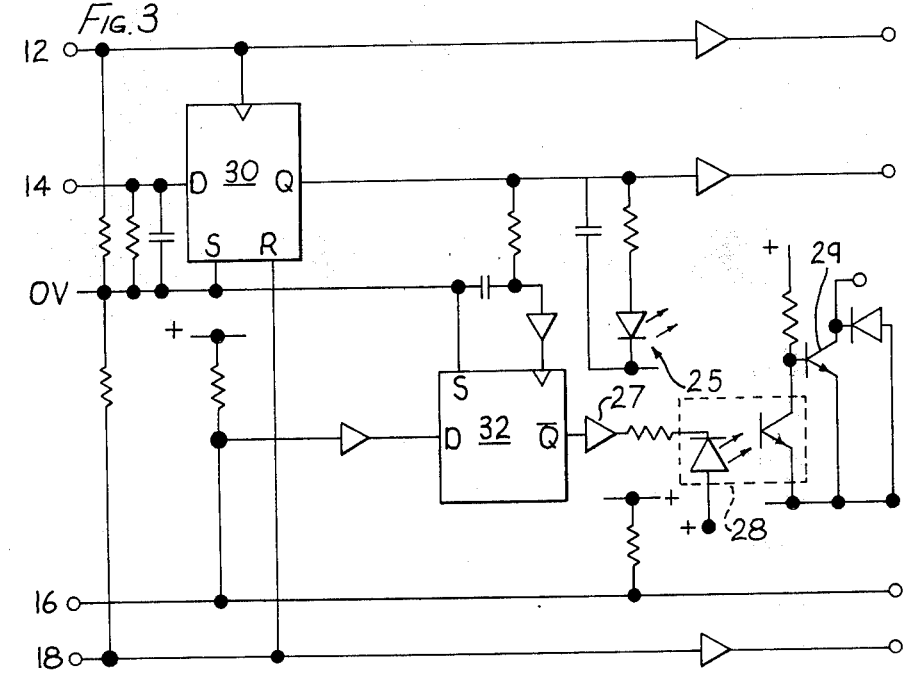

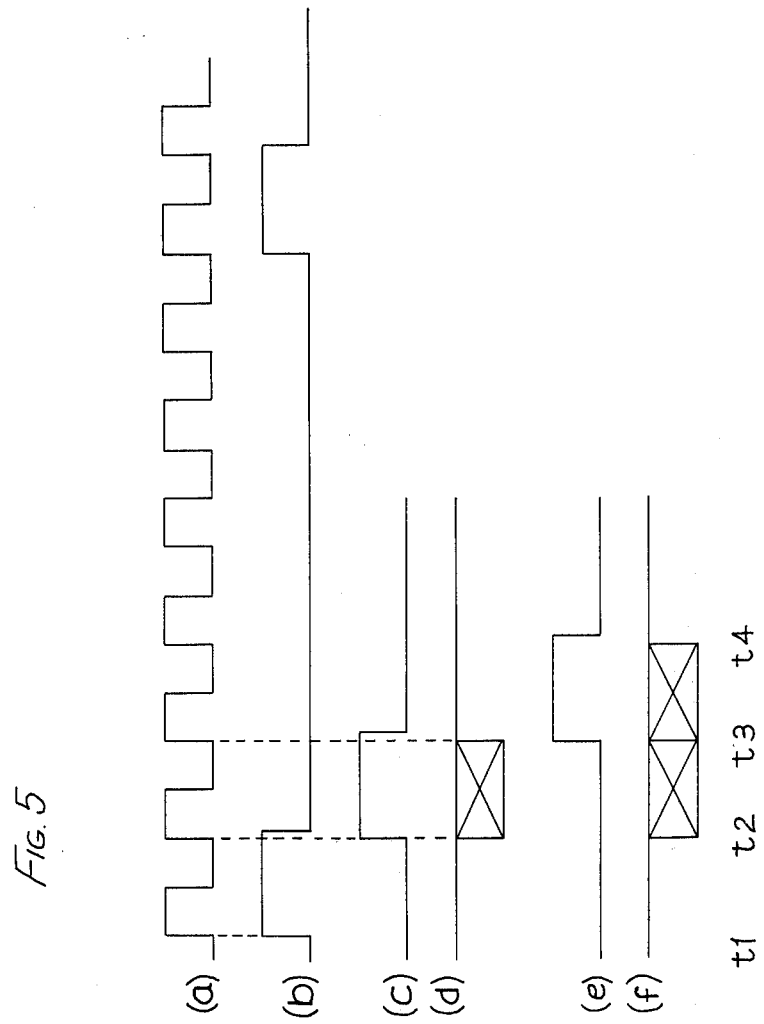

CIGARETTE PACKAGING MACHINE CONTROL AND MONITORING SYSTEM

The present invention relates to a cigarette packaging machine control and monitoring system, e.g. for supplying periodic control signals to each of a plurality of parts of a packaging machine or to each of a plurality of packaging machines, and for monitoring faults or other special conditions in such machines or machine parts.

A cigarette packaging operation comprises a large number of often delicate operations which need to be initiated reliably and rapidly in predetermined and periodically repeated sequences. In addition, the machine parts performing these delicate operations are subject to faults and it is highly desirable in the cigarette industry for such faults to be determined and located quickly.

Normally, cigarette packaging machines have control and monitoring systems which require separate wires running from a central control to each of the plurality of machines or machine parts. Such systems result in complex wiring systems which are expensive, difficult to install and maintain, and tend to be unreliable as wires can break, thus affecting the operation of the system without being noticed immediately. The complexity of such known systems also renders them not easily adaptable to expansion to control and monitor a larger number of machine operations.

According to one aspect of the present invention there is provided a packaging machine, for packaging cigarettes or other rod-like articles of the cigarette industry, comprising: a plurality of separate machine parts for effecting respective operations associated with such packaging; a plurality of remote stations respectively connected to some or all of said parts, each station comprising an input station arranged (when interrogated) to receive signals from the respective part signifying the presence of a fault or other special condition, or comprising an output station being arranged (when interrogated) to supply a machine control signal to the associated part; a control center station connected with all the remote stations in cascade, and including means for integrogating the first remote station in the cascade, each station including means for relaying an interrogation signal to the next station so that the remote stations are sequentially interrogated in turn, the system including also an information line for transferring fault and control signals between the remote stations and the control center station.

Preferably the stations are connected in cascade in a ring so that interrogation control signals propagate from the control station, through all the remote stations and return to the control station.

Hence, according to a second aspect of the invention there is provided a control system comprising: a plurality of stations including a plurality of remote stations and a control station for interrogating the remote stations; connecting means coupling the stations in cascade in a ring; an information line connected to all the stations for transferring information between the control stations and an interrogated remote station; the control station including means for generating an interrogation control signal and being arranged to supply the interrogation signal to the first station in the ring; and each station including means for relaying a received interrogation signal after a delay to the next station in the ring so that the stations are repeatedly sequentially interrogated during respective essentially non-overlapping time periods.

A warning device may be operated, if the interrogation signal does not return to the control station within a preset time, to indicate line faults.

Each remote station preferably includes an indicating device, e.g. an LED for indicating when the associated remote station is being interrogated.

Hence the location of a line fault may be identified if the control station has means for manually applying an interrogation signal to the remote stations to light up all the LED's between the control station and the line fault.

The information line is preferably a two-way closed loop line.

The relay means may comprise a bistable device such as a D-type latch.

According to the third aspect of the present invention there is provided a control system comprising a control center station; a plurality of remote stations; a transmission line network interconnecting the control center station and the remote stations and including a clock line and an information line, each common to all the stations, and a control line connecting the stations in cascade so that a control signal from the control center sequentially enables the stations during successive essentially non-overlapping time periods to communicate with the information line, each station comprising a first bistable device arranged to be clocked from the clock line and a second bistable device arranged to be clocked by the output of the first bistable device for communicating with the information line during the respective time period.

The second bistable devices of each input station are preferably arranged for storing a fault (or other special condition) when it occurs so that it can be transmitted to the control station when the associated remote input station is next interrogated.

Multiplexing means is preferably provided in the control center station to enable a signal to be routed between input/output stations and output/input ports at the control center, each output/input port being uniquely associated with a station.

For a better understanding of the present invention and to show how the same may be carried into effect, reference will now be made to the accompanying drawings, in which:

FIG. 1 is a schematic block diagram of a system according to the present invention;

FIG. 2 is a circuit diagram of an input station of the system of FIG. 1;

FIG. 3 is a circuit diagram of an output station of the system of FIG. 1;

FIG. 5 is a timing diagram of signals pertaining to the system of FIG. 1.

Figure 4:
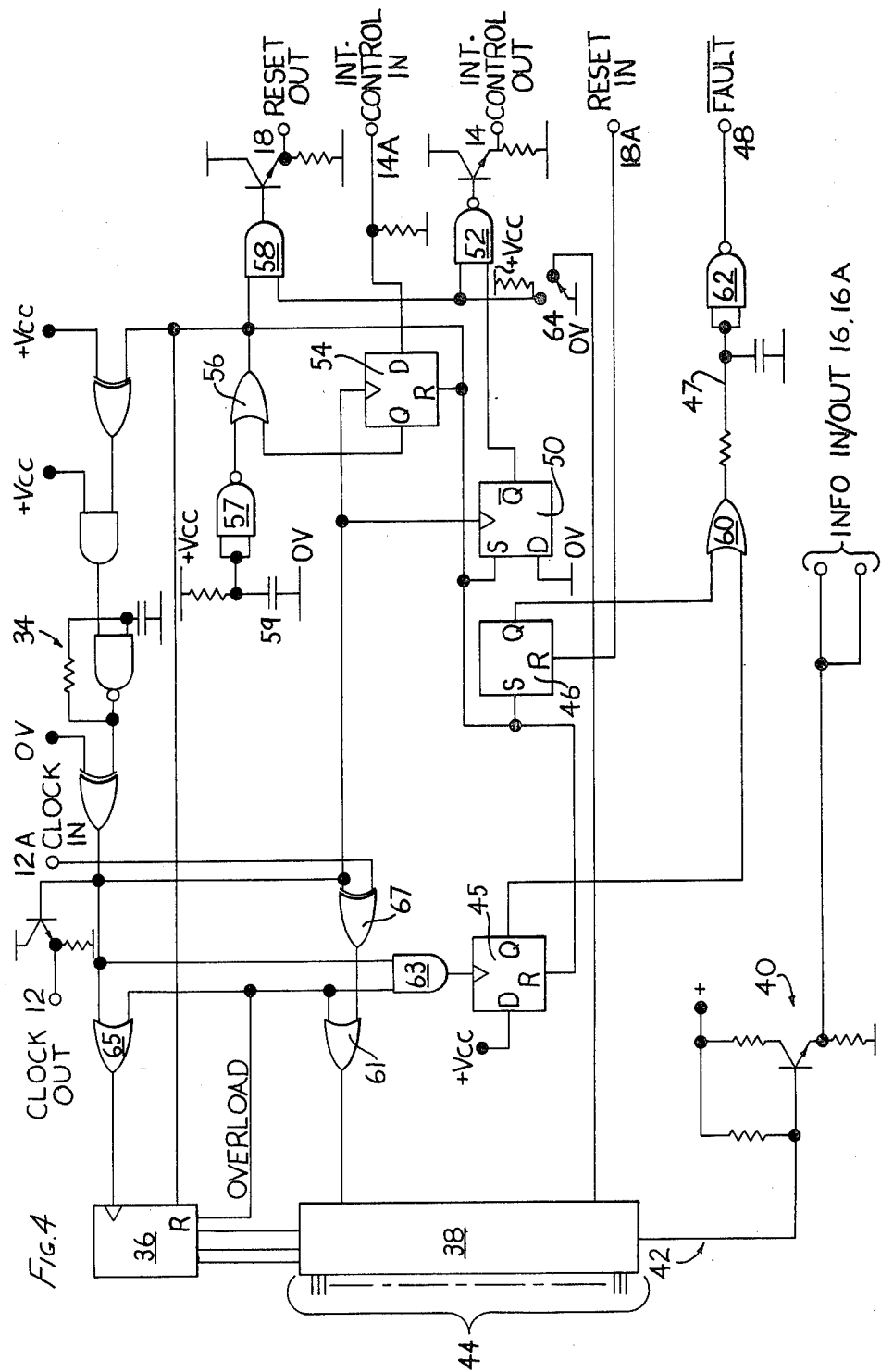
FIG. 4 is a circuit diagram of the control center of the system of FIG. 1.

FIG. 1 shows a control center 1 and four remote stations 2 and 3 connected together in a ring by wires 4. In practice, more than four stations will be connected in the ring, as is indicated by the chain dotted line in the wires 4. Each station may be associated with a machine or with a part of a machine to be controlled or monitored and is either an input station 2 (FIG. 2) for detecting faults in its associated machine or machine part, or an output station 3 (FIG. 3) for controlling, e.g. switching on or off, its associated machine or machine part.

The control center 1 controls the stations 2 and 3 by sequentially interrogating them in a time division manner, to be explained hereinafter, so that the input stations 2 deliver information to the control center 1, and the output stations 3 receive information from the control center 1, each in its own discreet time slot which identifies the station which is communicating.

Information received from or to be sent to each station 2 and 3 is delivered to or from the control center 1 via linking circuitry 5 and interface lines 6 and 7 respectively. The number of interface lines 6 corresponds to the number of stations. Interface lines 6 are linked to the input stations 2 and receive, for example, fault signals delivered by the input stations 2 to the control center 1. Line 6 consists of a buffer amplifier 8 with a feedback resistor 9 connected across it to keep information, once received from the control center 1, at the output of line 6 even after the information signal is removed from the input to amplifier 8 while the other stations are interrogated. An indicating device such as an LED (not shown) may be connected to the line 6 to light-up when the information signal indicates that a station has deteced a machine fault.

Line 7 has an amplifier 10 for feeding in signals for an output station 3.

The wires 4 comprise a clock line 12, an interrogation control line 14, an information line 16 and a reset line 18 together with power lines + and 0. These lines run, as shown, from the control center 1 to each station 2 and 3 in turn and back to the control center 1.

FIGS. 2 and 3 show an input and an output station 2 and 3 respectively. Each comprises two positive edge triggered D-type bistables 20, 22 and 30, 32 respectively, connected as shown.

The first bistable of each station (20, 30) receives interrogation control signals on control line 14 from the previous station (or from the control center 1 in the case of the first station), delays the interrogation control signal and passes it on to the next station. Light emitting semi-conductor devices such as LED's 24, 25 are provided at the output of each first bistable 20, 30 to indicate when that station is being interrogated.

The second bistable of each station (22, 32) acts as a store for the information to be transferred to or from the control center 1. After the first bistable in a station receives the interrogation control signal via line 14, then the second bistable 22, 32 communicates such information with the control center 1 via information line 16.

Control center 1 supplies clock pulses ("a" in FIG. 5) on clock line 12 to the first bistable of each station 20 (FIG. 2) and 30 (FIG. 3) continuously. At the start of each interrogation cycle, the control center 1 sends a reset pulse on line 18 to reset the first bistables 20 (FIG. 2) and 30 (FIG. 3). Sequentially, an interrogation control pulse is generated ("b" FIG. 5) by the control center 1 and received at the "D" input of the first bistable 20 of the first station 2 (FIG. 1) in the ring at time $t_1$ (FIG. 5). The first bistable 20 changes state at the next positive-going clock pulse edge, at time $t_2$ in FIG. 5, causing its "Q" output to go "high" and pulse "c" in FIG. 5 to be generated and propagated to the next station 3 (FIG. 1). Simultaneously the "$\bar{Q}$" output of the first bistable 20 goes "low" and this negative-going pulse is applied as an enable signal to the clock input of the second bistable 22. Bistable 22 has its "D" and "R" inputs connected to ground and its "S" input connected to receive a positive voltage if there is a fault in the machine or machine part associated with that station. This is achieved, in this example, using an opto-coupler device 26 whose output goes "high" when a transducer feeding it (not shown) detects a machine fault. Of course the input station could be used to monitor any specified condition so long as a suitable transducer for detecting the condition is available and connected to the opto-coupler 26. Hence, if a machine fault (or other specified condition) is present, then the "S" input of bistable 22 is "high"; therefore bistable 22 is set, i.e. its "Q" output is "high". The output of the first bistable 20 interrogates bistable 22 to determine its state, i.e. to determine whether a fault exists at the machine associated with that station. It does this via diodes 31 and 33 which act as an "AND" gate. If the "Q" outputs of both bistables 20 and 22 are "high", then point 35 is "high" and transistor 37 is switched on. This causes a negative pulse, coincident with the positive pulse at the "Q" output of bistable 20, to appear on the information line 16 in a unique time slot $t_2$-$t_3$ ("d" in FIG. 5) identified with the first station. When the "Q" output of bistable 20 goes "low" again, the "$\bar{Q}$" output goes "high" resetting bistable 22 if the fault has disappeared, i.e. if "S" is "low".

The positive at the "Q" output of the first bistable 20 of the first station 2 ("c" in FIG. 5) is propagated to the next station, e.g. to the output station 3 illustrated in FIG. 3. The operation of this output station will now be described. This delayed control pulse is received at the "D" input of the first bistable 30, causing bistable 30 to change state at the next positive-going clock pulse edge, i.e. at time $t_3$ in FIG. 5. Hence pulse "e" (FIG. 5) appears at the "Q" output of bistable 30 and propagates to the next station. Pulse "e" (FIG. 5) is also applied to the clock input of the second bistable 32 of this output station 3. If the control center 1 desires to pass a machine control signal to a machine or device associated with this output station 3 then the control center 1 will apply the machine control signal to "information" line 16, which is connected to the "D" input of the second bistable 32, in the appropriate time slot for this station, which is $t_3$ to $t_4$ (FIG. 5). The clock input to bistable 32 will cause the machine control signal applied to the "D" input to be passed to the "Q" output (not shown) of bistable 32 causing the "$\bar{Q}$" output to adopt the complementary logic state (i.e. "low" in this example). The machine control signal is then passed to the device to be operated, in this example from the "$\bar{Q}$" output of bistable 32 via buffer amplifier 27, optocoupler 28 and output transistor 29.

Hence in this example it can be seen that the first station 2 is interrogated in the period $t_2$ to $t_3$ and passes a machine fault signal to the control center 1 via line 16 during that period, and subsequently station 3 is interrogated during period $t_3$ to $t_4$ during which time it receives a machine control signal from the control center 1 via line 16. Subsequent stations are interrogated in the same way in subsequent time periods. Race hazards are prevented by connecting capacitors in the interrogation control line, as shown, so that the interrogation control pulses are slightly elongated, as shown at (b) and (c) in FIG. 5.

FIG. 4 shows the circuit of the control center 1. There are four output terminals 12, 14, 16 18 and four input terminals 12A, 14A, 16A, 18A corresponding to the start and finish respectively of the lines 12, 14 16 and 18 of FIGS. 1 to 3.

The control circuit comprises a pulse generator 34 connected to a counter 36 which drives a multiplexer 38. Information such as machine control signals for output stations 3 and fault signals from input stations 2 are applied from/to the multiplexer 38 via terminals 16, 16A, transistor 40 and information terminal 42. A number of multiplexer output ports 44 is provided which corresponds to the number of input/output stations in the system. These output ports are connected via linking circuit 5 to appropriate interface lines 6 and 7 (FIG. 1). The multiplexer 38 and the counter 36 operate to connect each output port in turn to information terminal 42 in such a way that signals can pass in either direction.

Other circuit elements are provided for self-checking purposes for detecting faults in the operation of the control circuit itself. Bistable 45 detects if there is a break in the system ring by monitoring whether or not the control returns to terminal 14A within a predetermined time period, i.e. before the counter 36 has overloaded. Bistable 46 checks the reset signal returns, via terminal 18A. If either the control signal or the reset signal does not return, a fault signal is generated, after a delay by delay circuit 47, at terminal 48 which may light an LED or operate an audible warning device (not shown).

Bistable 50 and "AND" gate 52 provide the interrogation control signal at terminal 14 to be delivered to the stations via line 14. Bistable 54 together with gates 56, 57, 58 provides a "RESET" signal via terminal 18 at the start of each interrogation cycle.

The operation of the control center 1 will now be explained in more detail.

When the power (Vcc) to control center 1 is first turned on, capacitor 59 at the input to NAND gate 57 is uncharged, so the output of gate 57 is "high". Once capacitor 59 is charged, the output of gate 57 goes "low". Hence a pulse signal is generated at the output of gate 57 and forms an internal reset pulse at the output of "OR" gate 56. This resets counter 36, bistables 54, 45 and causes the output of "AND" gate 58 to go "high" generating a "RESET" signal at output terminal 18 which propagates round line 18 resetting the first bistables (e.g. 20, 30) of all the input/output stations 2,3. The internal reset signal also sets bistables 46 and 50. Bistable 46 is reset almost instantaneously as the "RESET" signal reappears at "RESET IN" terminal 18A. If there is a break in the reset line 18 and the "RESET" signal does not reappear at terminal 18A then the "high" "Q" output of bistable 46 will cause a fault signal to be generated, via "OR" gate 60, delay circuit 47 and "NAND" gate 62, at terminal 48.

The "Q" output of bistable 50 remains "high" until the next clock pulse so that the "$\overline{Q}$" output is a negative-going pulse having a length equal to the clock pulse period. This is applied to gate 52 to generate a positive-going control pulse at terminal 14 (signal "b" in FIG. 5).

The interrogation control pulse then propagates sequentially through the stations 2 and 3 along line 14 as explained above with reference to FIGS. 2 and 3. Counter 36 drives multiplexer 38 through its states, exchanging "information" between each of the terminals 44 in turn and line terminal 42 in time periods appropriate to the station being addressed.

When the interrogation control pulse has propagated through all the stations it arrives back at the control center at terminal 14A "CONTROL IN" signifying the end of an interrogation cycle. It causes bistable 54 to change state at the next positive going clock pulse, applying a positive-going pulse from the "Q" output of bistable 54 to an input of "OR" gate 56, causing an internal reset and a "RESET" pulse to be generated again, resetting the whole system and starting the interrogation cycle off again by generating another interrogation control pulse at terminal 14.

If there is a break in the control line 14 then the interrogation control pulse will not return to terminal 14A. The counter 36 will reach its maximum count and generate an "OVERLOAD" signal to deactivate multiplexer 38 via gate 61 and to clock bistable 45, via AND gate 63, to generate a fault signal at terminal 48, via elements 60, 47 and 62. The "OVERLOAD" signal also stops counter 36 via gate 65.

To find out where the break in the circuit has occurred an operator will activate switch 64 which applies a positive-going edge to line 14 via gate 52. This causes the "Q" outputs of all the first bistables of those stations whose control lines 14 are before the break and are still connected to terminal 14 of the control center 1, to go "high", lighting all the LED's before the break. Hence the break point is easily determined. It should be noted that a break in the information line is not as serious as a break in the interrogation control and reset lines. A single break will not stop the transfer of information because the information can travel either way round the loop formed by line 16. A double break would stop the transfer of information to/from the stations between the breaks.

To ensure that the multiplexer 38 is properly synchronised to the appropriate time periods for each station, the clock pulse is fed back to the control center at terminal 21A and the "CLOCK OUT" and "CLOCK IN" pulse phases are compared in "exclusive OR" gate 67. This is important as the clock pulses obviously take a finite time to propagate around the ring of stations.

Hence it can be seen that a system as described herein is particularly reliable and has a self-checking mechanism which provides for simple location of many station or control center faults. The system is also very easy to expand as extra stations can be added into the ring in any position without need for fundamental change to the control circuit (so long as the capacity of the multiplexer is not exceeded).

It will be appreciated that alternative equivalent combinations of logic elements to those illustrated and herein described may be used to equal effect.

A control system as herein described is particularly useful for cigarette packing machines but it may also be used to advantage on cigarette handling or making machines or indeed on machines not connected with the cigarette industry.

As a specific example, the control system herein described may be used on the Molins HLP 4 cigarette packaging machine.

In this case input stations will be connected to, for example, a cigarette ends detector, a missing cigarette detector, a foil "run out" detector, a missing bundle detector, a broken packet detector, and a missing long flap detector, among others.

Output stations will be connected to control a reject solenoid, a gum flow solenoid, a gum lift solenoid, a main motor brake solenoid, blank reservoir solenoids, and a wrapper link up, amongst others.

Some of the information collected by input stations will be fed to a memory and used to determine the information fed to output stations. For example if a missing cigarette detector determined that a cigarette was missing, this information would be fed to the appropriate input station. Upon interrogation, that input system would send the missing cigarette information to the control station which would route the information to a memory. The memory would then store the information for an appropriate time, i.e. until the faulty packet had reached a rejection area. Whence it would send a signal back to the control center station for passing onto the output station connected to the reject solenoid which would then reject the faulty packet. Obviously extra timing circuits are needed for controlling the memory in the case of some of the operations.

We claim:

1. A packaging machine, for packaging cigarettes or other rod-like articles of the cigarette industry, comprising a plurality of machine parts for effecting respective operations associated with such packaging, a plurality of remote stations respectively connected to at least some of said parts, at least one of said remote stations comprising an input station arranged, when interrogated, only to receive signals from the respective part signifying the presence of a fault or other special condition, and at least another of said remote stations comprising an output station arranged, when interrogated, only to supply a machine control signal to the associated part, a control station connected with all of the remote stations in cascade and including means for interrogating the first remote station in the cascade, each station including means for relaying an interrogation signal to the next station so that the remote stations are sequentially interrogated in turn, and means including an information line connected to said remote stations and said control station for transferring fault and control signals between the remote stations and the control station.

2. A packaging machine according to claim 1 wherein the stations are connected in cascade in a ring.

3. A packaging machine according to claim 1 wherein said control station comprises a set of input/output ports and multiplexing means arranged for connecting respective input/output port to their associated remote stations.

4. A packaging machine according to claim 1, wherein the information line is a closed loop to which each of the stations is connected such that information signals can be transferred between the control station and an interrogated remote station in either one of the two opposite directions round the loop.

5. A packaging machine according to claim 2 or 4 wherein the control station comprises means for operating a warning device if the interrogation control signal is not received back at the control station within a preset time, thereby to determine line faults in the system.

6. A packaging machine according to claim 1 wherein each remote station comprises an indicating device for indicating when a remote station is being interrogated.

7. A packing machine according to claim 3 wherein each of said input/output ports has a light emitting device for indicating that a signal has been received from or sent to its associated remote station.

8. A packaging machine according to claim 1 wherein each input station includes a latching circuit arranged for storing a fault, or other special condition, signal when it occurs, so that it can be transmitted to the control station when the remote station is next interrogated.

9. A packaging machine according to claim 1 wherein said relaying means of each station comprises a bistable device having its input connected to the output of the bistable device of the previous station, and its output connected to the input of the next station.

10. A packaging machine according to claim 9 wherein the control station comprises means for generating a clock pulse train on a clock line which is connected to all the stations to clock the bistable devices thereof.

11. A packaging machine according to claim 10 comprising means for resetting all of the first bistable devices at the end of an interrogation cycle.

12. A packaging machine according to claim 8 wherein the latching circuit is a second bistable device.

13. A packaging machine according to claim 12 wherein the relaying means includes a first bistable device and the second bistable device is arranged to be clocked in synchronism with the output of the first bistable device.

14. A machine for handling or processing material, consisting of a plurality of machine parts for effecting respective operations associated with said handling or processing; a plurality of remote stations respectively connected to at least some of said parts, said remote stations including at least one input station and at least one output station; a control station for receiving condition signals from said input station and for supplying control signals to said output station; and connection means for connecting said control station and said remote stations to operate in cascade to supply signals to or receive signals from said control station in respective time slots of a periodically repeated time frame; wherein said connection means includes a clock line, an interrogation line and an information line;

said control station includes first means for applying clock signals to said clock line, second means for periodically applying an interrogation signal to said interrogation line, and third means for supplying control signals to or receiving condition signals from said information line; and said remote stations each include fourth means responsive to said interrogation signal and a clock pulse received on said connection means for generating an enable signal in the remote station during an assigned time slot of said periodically repeated time frame, and fifth means responsive to said enable signal for applying a condition signal to or receiving a control signal from said information line in conjunction with an associated one of said machine parts.

15. A machine according to claim 14, wherein said third means includes multiplexing means for selectively connecting said information line to a plurality of input/output terminals so that control signals are supplied to said information line from respective input terminals and condition signals are supplied to respective output terminals from said information line during the time slots of said periodically repeated time frame assigned to said respective input and output terminals.

16. A machine according to claim 14, wherein said clock line is a continuous line which is connected to said fourth means in each remote station and said fourth means includes means connected in series with said interrogation line for reproducing said interrogation signal in each terminal with a predetermined delay.

17. A machine according to claim 16, wherein said connection means connects said control station and said remote stations in a loop.

18. A machine according to claim 17, wherein said control station includes means for operating a warning device if said interrogation signal applied to said interrogation line is not received back at the control station within a preset time.

19. A machine according to claim 14, wherein said fifth means in each remote station includes storage means for storing a condition signal received from an associated machine part or a control signal received from said information line.

20. A machine according to claim 14, wherein said remote stations are connected in parallel to said clock line and said information line, while said interrogation line connects said remote stations in cascade so that said interrogation signal is passed along said connection means from one remote station to the next in successive time slots.

21. A machine according to claim 14, wherein said information line is a continuous line and said fifth means in each remote station is connected to said information line in parallel to the fifth means of all other remote stations.

22. A machine according to claim 14, wherein said fourth means in each remote station comprises a first bistable circuit having its input connected to the output of the first bistable circuit of the previous station and its output connected to the input of the first bistable circuit of the next station.

23. A machine according to claim 22, wherein said information line is a continuous line and said fifth means in each remote station comprises a second bistable circuit connected to said information line in parallel with the second bistable circuits of said other stations.

24. A machine according to claim 17, wherein said control station includes means for generating a warning signal if the interrogation signal applied to said interrogation line is not received back at the control station within a preset time.

25. A packaging machine, for packaging cigarettes or other rod-like articles of the cigarette industry, comprising:
(a) a plurality of separate machine parts for effecting respective operations associated with such packaging;
(b) a plurality of remote input stations and a plurality of remote output stations associated with the respective machine parts;
(c) connecting means linking the stations in cascade in a ring and including a clock line, an interrogation line and an information line;
(d) a control station connected in the ring and having means for interrogating an adjacent remote station in the ring by application of an interrogation signal thereto on said connecting means; each remote station having a first bistable device for relaying an interrogation signal received from a previous station to the next station in the ring and latching means for applying data to or receiving data from the information line in response to said first bistable device when that remote station is interrogated.

26. A machine for handling or processing material, consisting of a plurality of machine parts; a plurality of remote stations respectively connected to some or all of said parts, each station comprising an input station arranged when enabled to receive a signal from an associated machine part, signifying the presence of a fault, or comprising an output station arranged when enabled to supply a machine control signal to an associated part effecting a change in the operating procedure of the machine, there being a plurality of each of these types of stations; a control station; and connection means including an enabling control line for coupling the control station to a first remote station which in turn is connected to the next remote station in cascade and so on until the final remote station; the control station including means for enabling the first remote station in the cascade by applying an enabling pulse thereto via said connection means and each of the remote stations including means for relaying the enabling pulse to the next station, so that the remote stations are sequentially enabled, said control station further including means for causing the cycle enabling said remote stations in sequence to be constantly repeated while the machine is in operation; said connection means further including means having a clock line connected to each station for applying a sequence of timing pulses to the stations and means having an information line to which each station is connected in parallel for transferring fault and/or control signals between the remote stations and the control station.

27. A machine for handling or processing material, consisting of a plurality of remote stations coupled in cascade with a control station; said control station including means for applying an enabling pulse to the first remote station in the cascade, and each remote station including means for relaying said enabling pulse to the next remote station in the cascade so that each remote station receives said enabling pulse during a respective time slot of a time frame; at least one of said remote stations being an input station arranged when enabled to receive an information signal representing the condition of an associated detector including means for relaying said information signal to the control station; and at least one of said remote stations being an output station arranged when enabled to supply a machine control signal to an associated machine part effecting a change in the operating procedure.

28. A machine according to claim 27, including means having a clock line for applying a series of clock pulses from the control station to all of the remote stations.

29. A machine according to claim 28, including means having an information line for relaying said information signals from said remote stations to said control station and for supplying said control signals from said control station to said remote stations.

30. A packaging machine, for packaging cigarettes or other rod-like articles of the cigarette industry, comprising a plurality of separate machine parts for effecting respective operations associated with such packaging, a plurality of remote stations respectively connected to some or all of said parts, each remote station comprising an input station arranged, when interrogated, to receive signals from the respective part signifying the presence of a fault or other special condition, or comprising an output station arranged, when interrogated, to supply a machine control signal to the associated part, a control center station connected with all the remote stations in cascade and including means for interrogating the first remote station in the cascade, each station including means for relaying an interrogation signal to the next station so that the remote stations are sequentially interrogated in turn, the system including also an information line for transferring fault and control signals between the remote stations and the control center station, each remote station comprising an indicating device for indicating when a remote station is being interrogated, and wherein the indicating devices are light emitting diodes.

31. A packaging machine, for packaging cigarettes or other rod-like articles of the cigarette industry, comprising a plurality of separate machine parts for effecting respective operations associated with such packaging, a plurality of remote stations respectively connected to some or all of said parts, each remote station comprising an input station arranged, when interrogated, to receive signals from the respective part signifying the presence of a fault or other special condition, or comprising an output station arranged, when interrogated, to supply a machine control signal to the associated part, a control center station connected with all the remote stations in cascade and including means for interrogating the first remote station in the cascade, each station including means for relaying an interrogation signal to the next station so that the remote stations are sequentially interrogated in turn, the system including also an information line for transferring fault and control signals between the remote stations and the control center station, each remote station comprising an indicating device for indicating when a remote station is being interrogated, and wherein the control station comprises means for manually generating a check interrogation control signal which will interrogate all the remote stations between the check signal output and a fault in the interrogation line, to activate the indicating devices on those remote stations, thereby to indicate the position of the line fault.

* * * * *